United States Patent
Xu et al.

(10) Patent No.: US 7,401,965 B2
(45) Date of Patent: Jul. 22, 2008

(54) BACKLIGHT MODULE WITH LIGHT GUIDE PROTRUSION AND LIQUID CRYSTAL DISPLAY WITH SAME

(75) Inventors: Yi Xu, Shenzhen (CN); Ching-Huang Lin, Miao-Li (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/518,664

(22) Filed: Sep. 11, 2006

(65) Prior Publication Data

US 2007/0058396 A1    Mar. 15, 2007

(30) Foreign Application Priority Data

Sep. 9, 2005    (TW) .................................. 94215516

(51) Int. Cl.
*F21V 7/04*    (2006.01)

(52) U.S. Cl. ........................ 362/621; 362/612; 362/628

(58) Field of Classification Search ................. 362/608, 362/609, 610, 612, 613, 621, 622, 628, 27, 362/629

See application file for complete search history.

(56) References Cited

U.S. PATENT DOCUMENTS

| | | | |
|---|---|---|---|
| 5,600,455 A * | 2/1997 | Ishikawa et al. | 362/617 |
| 6,139,163 A * | 10/2000 | Satoh et al. | 362/612 |
| 6,474,826 B1 * | 11/2002 | Tanaka et al. | 362/612 |
| 6,508,564 B1 | 1/2003 | Kuwabara et al. | |
| 7,101,070 B2 * | 9/2006 | Yu et al. | 362/608 |
| 7,220,042 B2 * | 5/2007 | Tseng | 362/628 |
| 2005/0201120 A1 * | 9/2005 | Nesterenko et al. | 362/609 |
| 2006/0203511 A1 * | 9/2006 | Tseng | 362/621 |
| 2007/0147079 A1 * | 6/2007 | Wu et al. | 362/612 |

* cited by examiner

*Primary Examiner*—Y M. Lee
(74) *Attorney, Agent, or Firm*—Wei Te Chung

(57) ABSTRACT

An exemplary backlight module (1) includes a light guide plate (10) and at least one point illuminator (12). The light guide plate includes a first side surface (102), and a protrusion (14) outwardly extending from the first side surface. The protrusion includes at least one second side surface (144) oblique to the first side surface. The at least one point illuminator is adjacent to the least one second side surface.

1 Claim, 6 Drawing Sheets

BACKLIGHT MODULE WITH LIGHT GUIDE PROTRUSION AND LIQUID CRYSTAL DISPLAY WITH SAME

FIELD OF THE INVENTION

The present invention relates to backlight modules such as those used in liquid crystal displays (LCDs), and more particularly to a backlight module configured for achieving uniform optical output.

GENERAL BACKGROUND

Liquid crystal displays are commonly used as display devices for compact electronic apparatuses, because they not only provide good quality images but are also very thin. Because liquid crystal molecules in a liquid crystal display do not emit any light themselves, the liquid crystal molecules have to be lit by a light source so as to clearly and sharply display text and images. Therefore, liquid crystal displays usually require a backlight module.

Referring to FIG. 9, a typical backlight module 9 includes a light guide plate (LGP) 90, and three light emitting diodes (LEDs) 92. The light guide plate 90 has a side surface 902 for receiving incident light, and a top surface 904 for emitting the light. The top surface 904 adjoins the side surface 902. The light emitting diodes 92 are disposed adjacent to the side surface 902 of the light guide plate 90.

In operation, light beams from the light emitting diodes 92 enter the light guide plate 90 via the side surface 902, and are converted by the light guide plate 90 to form a surface light source at the top surface 904. However, each of the light emitting diodes 92 has a certain limited angle of divergence of light beams emitted therefrom. Therefore areas of the light guide plate 90 beyond the angles of divergence of the light emitting diodes 92, such as areas A and B, may be relatively dark areas. That is, the surface light source of the backlight module 9 may be non-uniform, and the performance of an associated LCD may be visibly impaired.

What is needed, therefore, is a backlight module that can overcome the above-described deficiencies. What is also need is a liquid crystal display employing such a backlight module.

SUMMARY

In a preferred embodiment, a backlight module includes a light guide plate and at least one point illuminator. The light guide plate includes a first side surface, and a protrusion outwardly extending from the first side surface. The protrusion includes at least one second side surface oblique to the first side surface. The at least one point illuminator is adjacent to the at least one second side surfaces.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
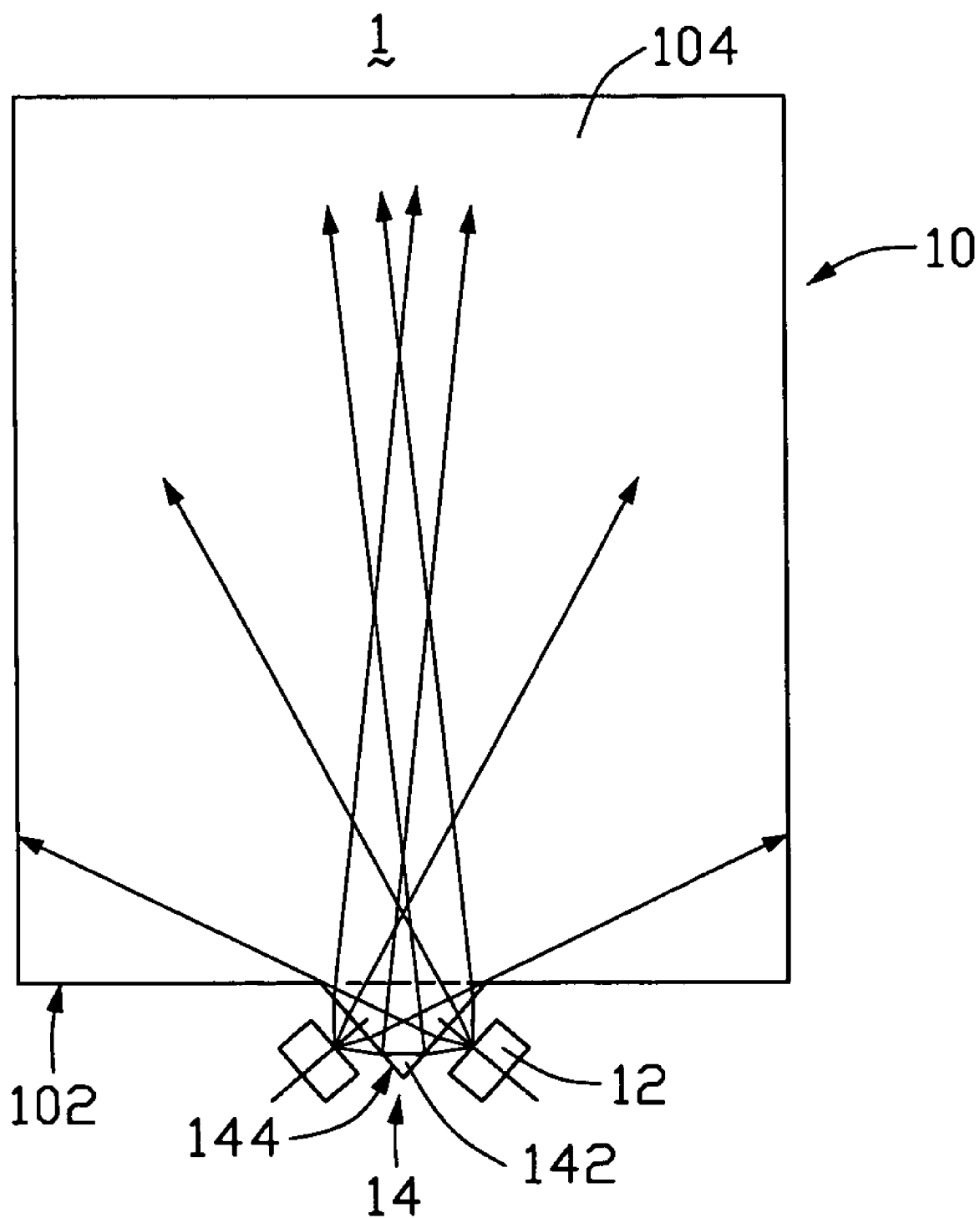
FIG. 1 is a top plan view of a backlight module according to a first embodiment of the present invention, showing essential optical paths thereof.

Referring to FIG. 1, a backlight module 1 according to a first embodiment of the present invention includes a light guide plate 10, and two light emitting diodes 12 disposed adjacent to the light guide plate 10. The light guide plate 10 has a first side surface 102, and a top light emitting surface 104 perpendicularly adjoining the first side surface 102. A protrusion 14 extends from the first side surface 102, the protrusion 14 being integrally formed with the light guide plate 10. The protrusion 14 is an isosceles triangular prism, and includes a triangular top surface 142 coplanar with the light emitting surface 104, and two second side surfaces 144 perpendicularly adjoining the top surface 142. The second side surfaces 144 are each oriented at an obtuse angle relative to the first side surface 102, and serve as light incident surfaces. The light guide plate 10 can for example be made from polycarbonate (PC) or polymethyl methacrylate (PMMA), and can for example be manufactured by an injection molding method.

Each light emitting diode 12 is disposed adjacent to one respective second side surface 144 of the protrusion 14. Light beams emit from the light emitting diodes 12 over a certain range of angles of divergence. When each light emitting diode 12 is viewed from above, the angle of divergence is generally in the range from 30 to 130 degrees, as measured from a front face of the light emitting diode 12. The divergence angle is defined to have a central axis (not labeled), which divides the divergence angle into two equal sub-angles. Each light emitting diode 12 is arranged such that its central axis is perpendicular to the respective second side surface 144.

In operation, light beams emitted from the light emitting diodes 12 are transmitted through the second side surfaces 144 into the light guide plate 10, and are then converted by the light guide plate 10 to provide a surface light source at the light emitting surface 104. In this process, because the second side surfaces 144 are oblique to the first side surface 102, the light beams from each light emitting diode 12 are respectively refracted to transmit into the light guide plate 10 in a range of predetermined angles. Thus the oblique angles of the second side surfaces 144 relative to the first side surface 102 and the distances between the light emitting diodes 12 and the respective second side surfaces 144 can be configured whereby light beams can reach all areas of a main body of the light guide plate 10 adjacent the protrusion 14. That is, dark areas such as the areas A and B of the above-described conventional light guide plate 10 are avoided. As a result, an improved uniformity of brightness of the backlight module 1 can be achieved.

Figure 2:
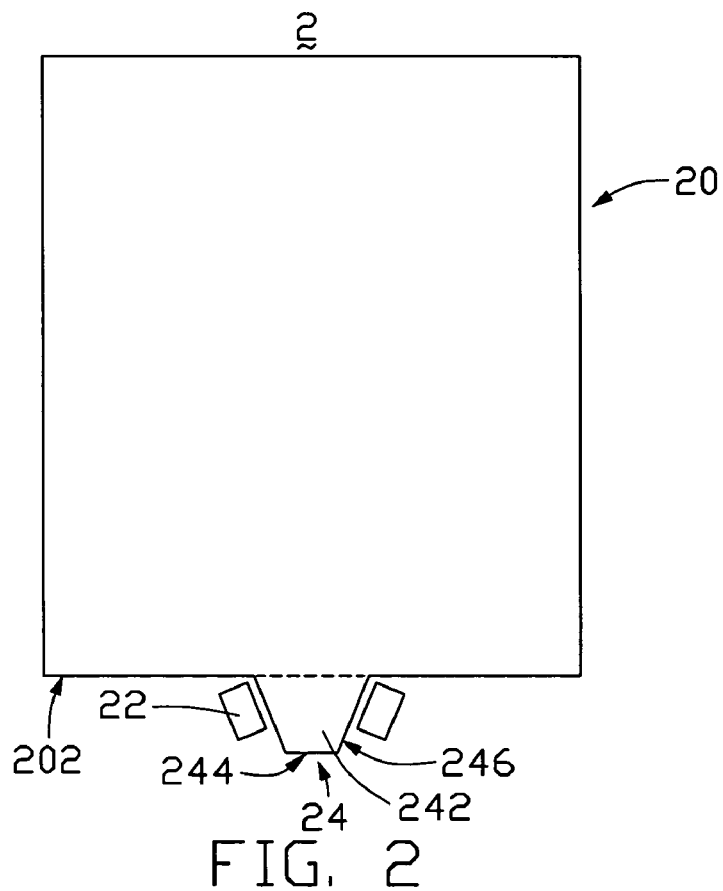
FIG. 2 is a top plan view of a backlight module according to a second embodiment of the present invention.

Referring to FIG. 2, a backlight module 2 according to a second embodiment of the present invention is similar to the backlight module 1. However, a protrusion 24 of a light guide plate 20 of the backlight module 2 is an isosceles trapezoidal prism, and includes an isosceles trapezoidal top surface 242. That is, a first spacing surface 244 adjoins and separates two third surfaces 246 of the protrusion 24, whereby a distance between two adjacent light emitting diodes 22 of the backlight module 2 is increased. The first spacing surface 244 is parallel to a fourth side surface 202 of the light guide plate 20, and is coated with a reflective layer to prevent light beams from leaking out from the protrusion 24 therethrough. The backlight module 2 has advantages similar to those described above in relation to the backlight module 1.

Figure 3:
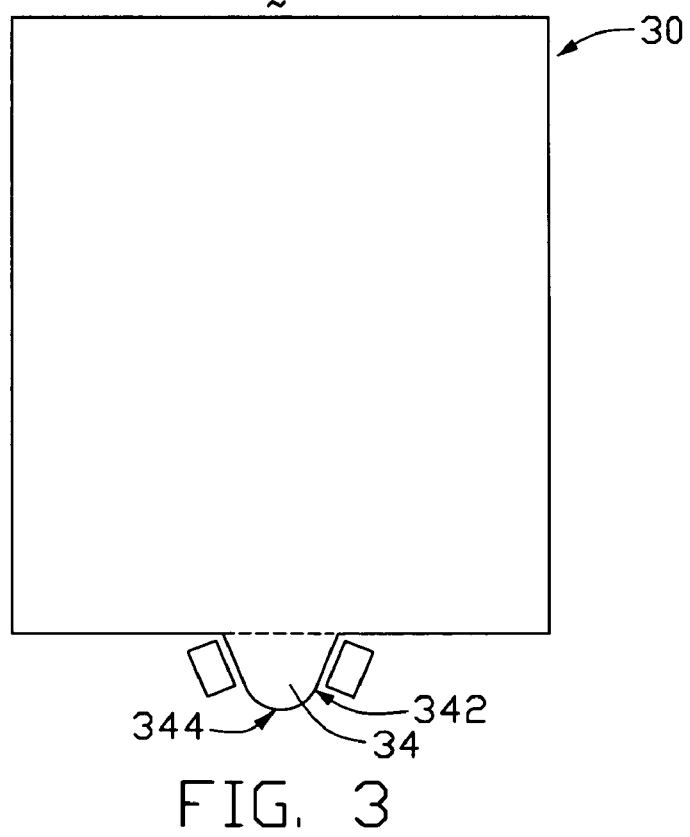
FIG. 3 is a top plan view of a backlight module according to a third embodiment of the present invention.

Referring to FIG. 3, a backlight module 3 according to a third embodiment of the present invention is similar to the backlight module 2. However, a protrusion 34 of a light guide plate 30 of the backlight module 3 has an outwardly curved second spacing surface 344. The second spacing surface 344 adjoins and separates two fifth side surfaces 342 of the protrusion 34.

Figure 4:
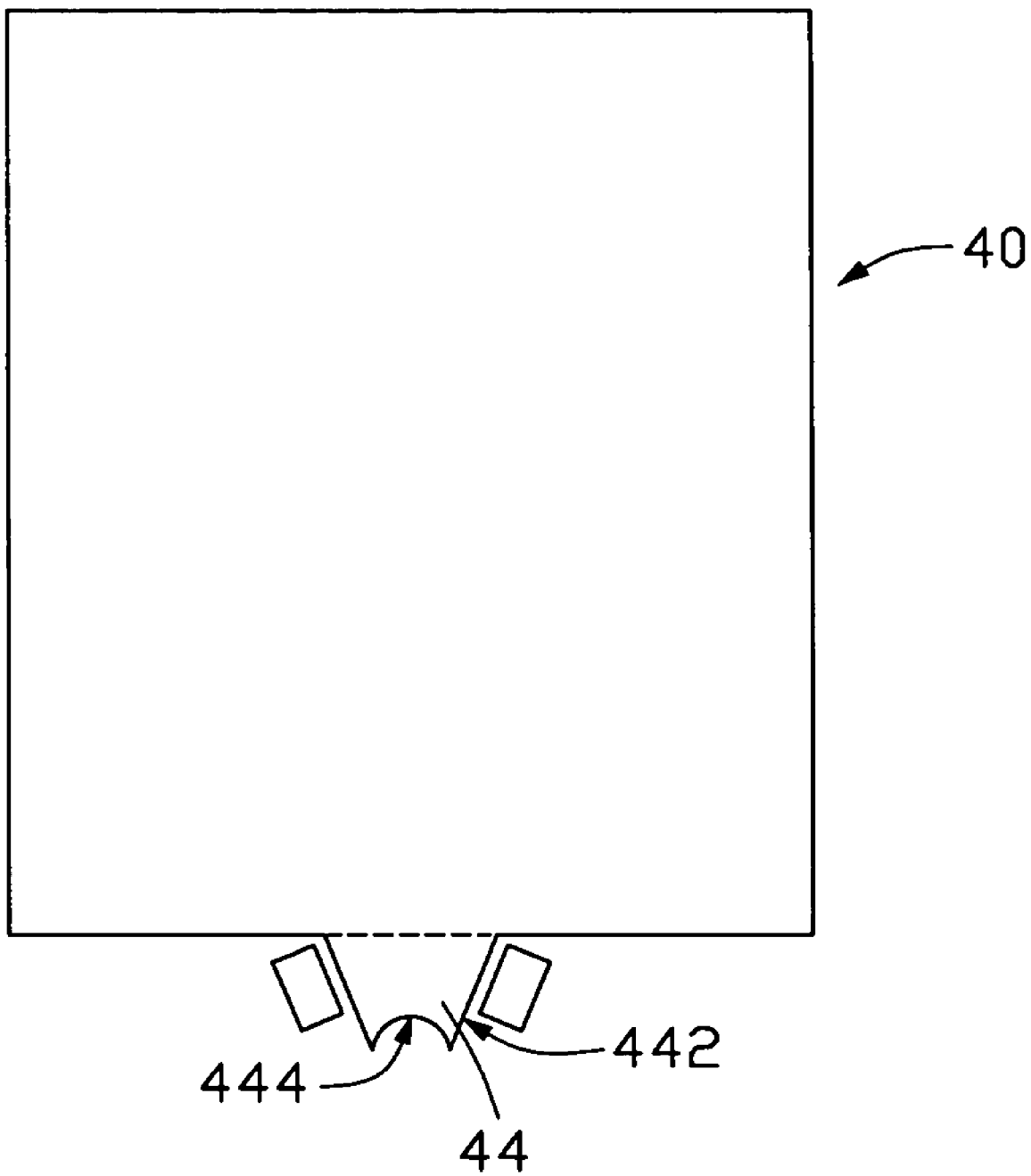
FIG. 4 is a top plan view of a backlight module according to a fourth embodiment of the present invention.

Referring to FIG. 4, a backlight module 4 according to a fourth embodiment of the present invention is similar to the backlight module 3. However, a protrusion 44 of a light guide plate 40 of the backlight module 4 has a concave third spacing surface 444. The third spacing surface 444 adjoins and separates two sixth side surfaces 442 of the protrusion 44.

Figure 5:
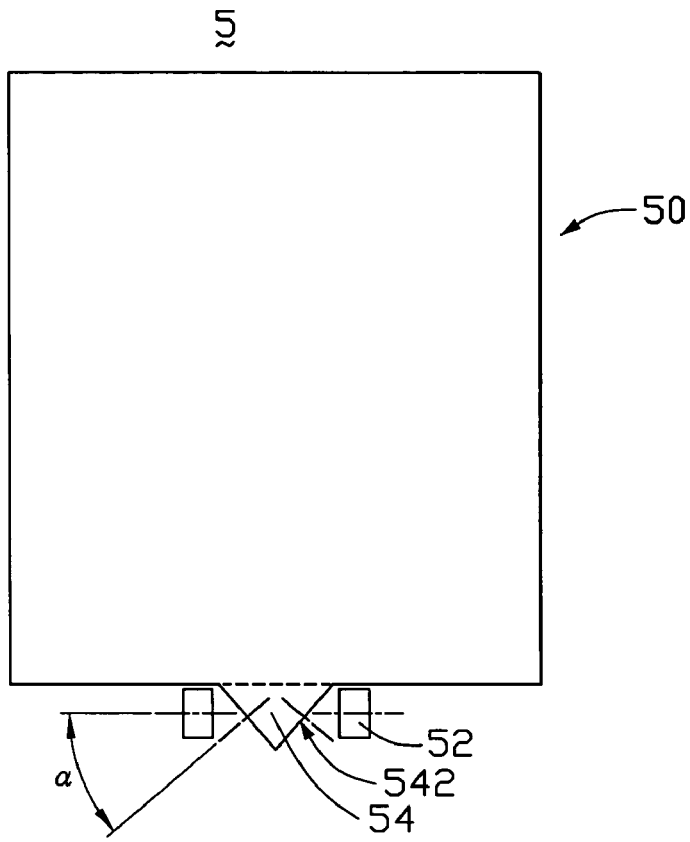
FIG. 5 is a top plan view of a backlight module according to a fifth embodiment of the present invention.

Referring to FIG. 5, a backlight module 5 according to a fifth embodiment of the present invention is similar to the backlight module 1. However, in the backlight module 5, a divergence angle of each of light emitting diodes 52 is defined to have a central axis (not labeled), which divides the divergence angle into two equal sub-angles. Each light emitting diode 52 is arranged such that its central axis maintains a predetermined angle α relative to a normal of a corresponding seventh side surface 542 of a protrusion 54 of a light guide plate 50. The angle α is in general an acute angle. Light beams transmitted into the light guide plate 50 can be controlled according to the predetermined angle α.

Figure 6:
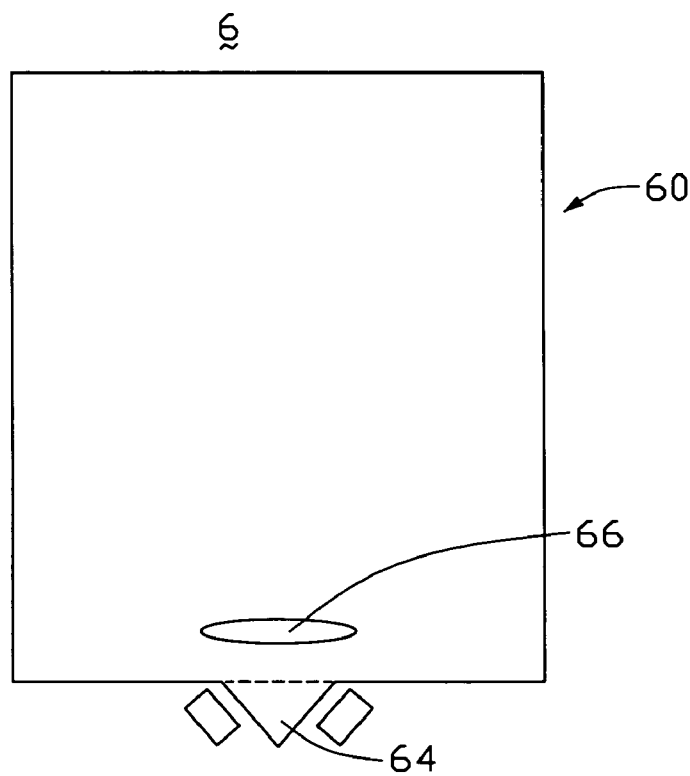
FIG. 6 is a top plan view of a backlight module according to a sixth embodiment of the present invention.

Referring to FIG. 6, a backlight module 6 according to a sixth embodiment of the present invention is similar to the backlight module 1. However, the backlight module 6 includes a light guide plate 60. The light guide plate 60 defines a blind hole 66, near a protrusion 64 of the light guide plate 60. The blind hole 66 can be empty (i.e. filled with air). Alternatively, the blind hole 66 can be filled with one or more transparent materials. The transparent materials are different from a material of which the light guide plate 60 is made, and are provided to diffuse and refract light beams in the light guide plate 60. As a result, the backlight module 6 can achieve a high level of brightness uniformity.

Figure 7:
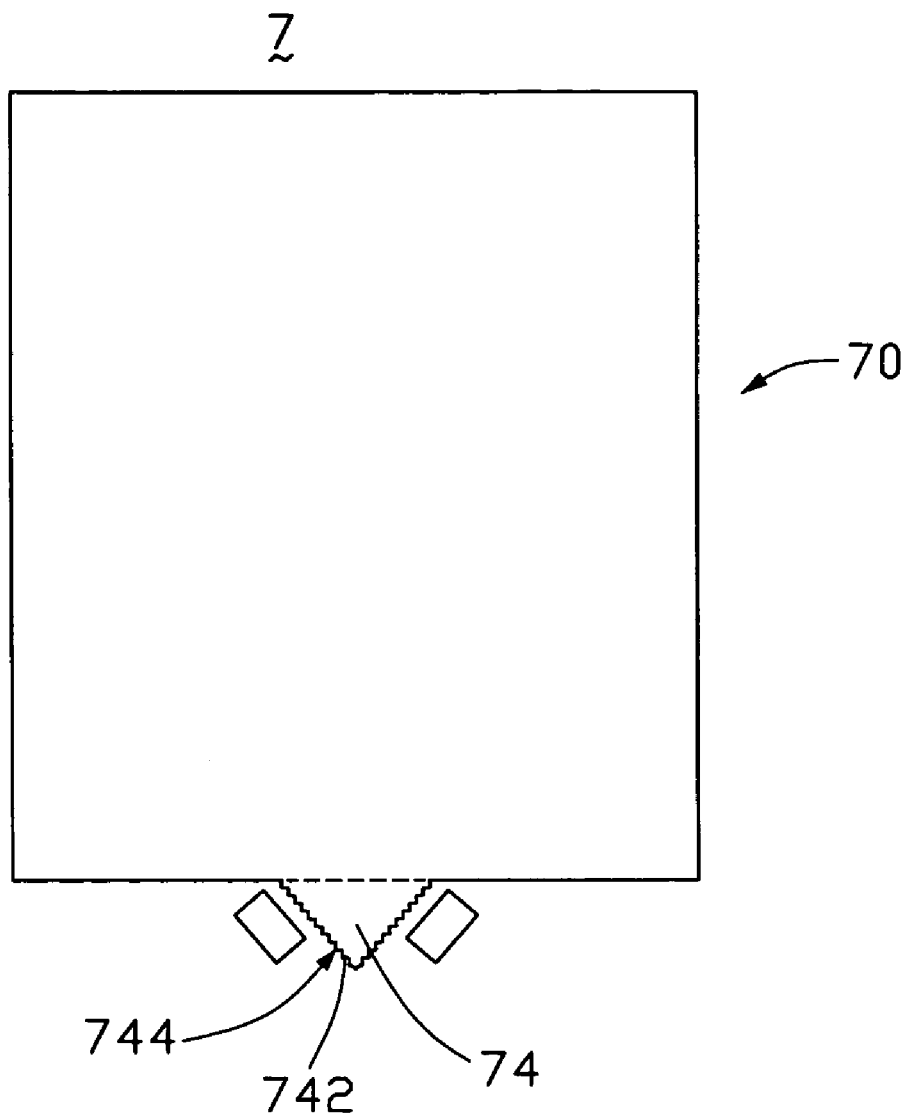
FIG. 7 is a top plan view of a backlight module according to a seventh embodiment of the present invention.

Referring to FIG. 7, a backlight module 7 according to a seventh embodiment of the present invention is similar to the backlight module 1. However, the backlight module 7 further includes a plurality of prism structures 744 integrally formed at two eighth side surfaces 742 of a protrusion 74 of a light guide plate 70 thereof. The prism structures 744 help diffuse light beams entering the protrusion 74 through the eighth side surfaces 742.

Figure 8:
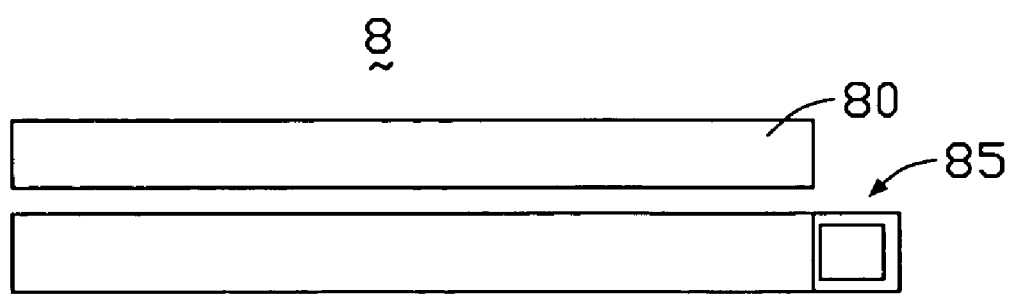
FIG. 8 is an exploded, side plan view of a liquid crystal display of an eighth embodiment of the present invention.
Figure 9:
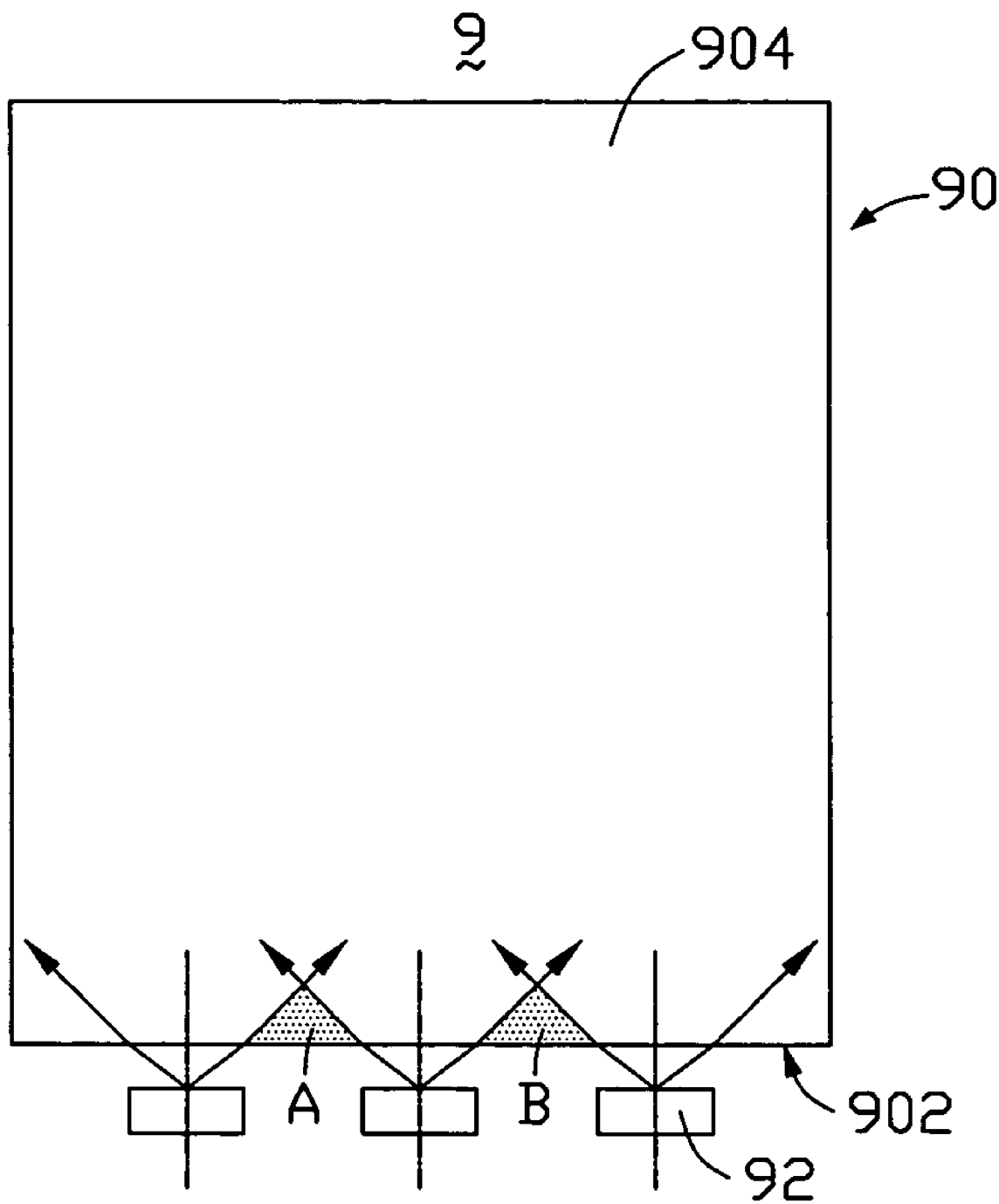
FIG. 9 is a top plan view of a conventional backlight module, showing essential optical paths thereof.

Referring to FIG. 8, a liquid crystal display 8 according to an eighth embodiment of the present invention includes a liquid crystal panel 80 and a backlight module 85. The backlight module 85 is adjacent to an inner side of the liquid crystal panel 80. The backlight module 85 can be any one of the above-described backlight modules 1 to 7. The liquid crystal display 8 has a high level of brightness uniformity.

Further or alternative embodiments may include the following. In one example, two or more protrusions may be formed at the side surface of the light guide plate of any of the above-described backlight modules. In such case, each of plural light emitting diodes is disposed adjacent to a respective light incident surface of a corresponding protrusion. In another example, the protrusions can be formed at two, three or four side surfaces of the light guide plate of any of the above-described backlight modules. In a further example, the protrusion can be a separate body from the light guide plate of any of the above-described backlight modules. In a still further example, the protrusion can have only one light incident surface oblique to the side surface of the light guide plate of any of the above-described backlight modules.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
   a light guide plate comprising:
      a first side surface; and
      a protrusion extending from the first side surface, the protrusion comprising at least one second side surface oblique to the first side surface; and
   at least one point illuminator adjacent to the at least one second side surface;
   wherein the light guide plate further comprises a blind hole defined therein, which hole is near the protrusion, and the blind hole is filled with one or more transparent materials, which are different from a material of which the light guide plate is made.

* * * * *